(12) United States Patent
Schramm

(10) Patent No.: US 10,760,733 B2
(45) Date of Patent: Sep. 1, 2020

(54) CAST-IN-PLACE ANCHORS

(71) Applicant: Black & Decker Inc., New Britain, CT (US)

(72) Inventor: Benjamin Schramm, Eppenrod (DE)

(73) Assignee: BLACK & DECKER INC., New Britain, CT (US)

(*) Notice: Subject to any disclaimer, the term of this patent is extended or adjusted under 35 U.S.C. 154(b) by 53 days.

(21) Appl. No.: 15/935,663

(22) Filed: Mar. 26, 2018

(65) Prior Publication Data
US 2018/0283606 A1 Oct. 4, 2018

(30) Foreign Application Priority Data

Mar. 31, 2017 (EP) ..................... 17164320

(51) Int. Cl.
*E04B 1/41* (2006.01)
*F16M 13/02* (2006.01)

(52) U.S. Cl.
CPC .......... *F16M 13/027* (2013.01); *E04B 1/4121* (2013.01)

(58) Field of Classification Search
CPC .... E04B 1/4121; E04B 1/4157; E04B 1/4128; E04B 1/4107; E04B 1/4135; E04G 21/185
See application file for complete search history.

(56) References Cited

U.S. PATENT DOCUMENTS

| 1,940,545 | A | * | 12/1933 | Holmes | E04B 1/4121 249/20 |
| 3,405,497 | A | * | 10/1968 | McNair | E04B 1/4121 52/699 |
| 3,507,315 | A | * | 4/1970 | Tummarello | E04B 1/4107 411/103 |
| 4,211,048 | A | * | 7/1980 | Naka | E04B 1/4121 411/427 |
| 4,283,899 | A | * | 8/1981 | Wakamiya | E04B 1/4121 411/432 |
| 6,792,734 | B2 | * | 9/2004 | Zambelli | B28B 23/005 52/125.1 |
| 7,296,382 | B2 | * | 11/2007 | Sack | E04B 1/4121 294/89 |
| 9,303,399 | B2 | * | 4/2016 | Espinosa | E04B 1/4114 |
| 9,394,706 | B2 | * | 7/2016 | Lin | E04G 15/04 |
| 9,945,115 | B2 | * | 4/2018 | Lin | E04G 15/04 |
| 10,151,102 | B2 | * | 12/2018 | Mahrenholtz | E04B 1/4121 |
| 2018/0187412 | A1 | * | 7/2018 | Espinosa | E04B 1/4121 |

* cited by examiner

*Primary Examiner* — Brian E Glessner
*Assistant Examiner* — Daniel J Kenny
(74) *Attorney, Agent, or Firm* — Kofi A. Schulterbrandt

(57) ABSTRACT

A cast-in-place anchor and method of securing it to a wooden form board. Such cast-in-place anchors include a body defining a cavity and having a base for positioning the body on a wooden form board. The body being securable to the wooden form board by at least one fixing member. An opening is disposed in the base in communication with the cavity and a plurality of additional openings are in the body in communication with the cavity. A threaded member is provided in the cavity. A support member is also provided in the cavity for supporting the threaded member and for restricting the ingress of wet concrete through the additional openings into contact with the threaded member in use. The anchor is configured such that after concrete pouring, concrete setting, and form board removal, a threaded rod can be inserted into the opening in the base of the body.

5 Claims, 8 Drawing Sheets

CAST-IN-PLACE ANCHORS

CROSS-REFERENCE TO RELATED APPLICATIONS

This application claims priority from EP Patent Application No. EP17164320.8, filed Mar. 31, 2017, the disclosure of which is incorporated herein by reference in its entirety.

FIELD

This specification relates to cast-in-place anchors and specifically concerns such anchors for mounting to a wooden form board.

BACKGROUND

The Wood-Knocker® II+ product is a cast-in-place anchor available for purchase while aspects of the present invention are conceived to improve upon this product.

SUMMARY

According to an aspect of the present invention there is provided a cast-in-place anchor comprising: a body defining a cavity and having a base for positioning the body on a wooden form board, the body being configured to be secured to the wooden form board by at least one fixing member; an opening in the base of the body in communication with the cavity; a plurality of additional openings in the body in communication with the cavity; a threaded member provided in the cavity; a support member also provided in the cavity for supporting the threaded member and for restricting the ingress of wet concrete through the additional openings into contact with the threaded member in use; wherein the anchor is configured such that after concrete pouring, concrete setting and form board removal in use a threaded rod can be inserted into the opening in the base of the body, past the support member and into threaded engagement with the threaded member for suspending a load from the anchor.

The body may comprise a plurality of separable body sections which cooperate to define the cavity and at least one nail guide for receiving a nail to secure the anchor to the wooden form board. Each said body section may comprise at least one set of guide members which are configured to interlock with the guide members of another said body section to form a said nail guide. Each said nail guide may be configured such that a nail received thereby in use restricts the respective body sections forming the nail guide from separating while securing the anchor to the wooden form board. Each said body section may be identical.

The body may have a rim extending towards the base of the body and at least partially encompassing the support member leaving an area of the underside of the support member exposed so as to contact concrete directly in use, optionally said rim may additionally leave an area of the side of the support member exposed so as to contact concrete directly in use. The support member may be an annular washer. The section of the cavity in which the threaded member is located may be shaped to restrict rotation of the threaded member.

The cast-in-place anchor may further comprise at least one additional threaded member, wherein each respective said threaded member has a different thread diameter and is arranged to transfer a downwards force applied thereto in use to the support member. In such embodiments the cavity may be shaped to restrict rotation of each said threaded member.

The or each said threaded member may be a threaded nut. The body may further comprise at least one fin extending from the base to the top of the body, each said fin defining a surface that is inclined in a direction towards the top of the body. The body may be formed of plastic, the support member may be formed of metal and also the or each said threaded member may be formed of metal. According to another aspect of the present invention there is provided a kit of parts comprising: respective parts of a body; a support member; and at least one threaded member for forming a cast-in-place anchor according to any preceding arrangement.

According to a further aspect of the present invention there is provided a method of securing a cast-in-place anchor to a wooden form board comprising the steps of: providing separate body sections of a cast-in-place anchor; interlocking the separate body sections together to form a cavity and at least one nail guide, this step further involving securing a threaded member and a support member for supporting the threaded member between the body sections; positioning the interlocked body sections on a wooden form board such that an opening that communicates with the cavity is located adjacent the form board, a volume in the cavity extending between said opening and the threaded member; and inserting a fixing member through each of the at least one nail guides to restrict the interlocked sections of the cast-in-place anchor from separating, wherein the or each said fixing member is further caused to protrude from the anchor into the wooden form board.

BRIEF DESCRIPTION OF THE DRAWINGS

Embodiments will now be described by way of non-limiting example with reference to the accompanying drawings in which.

DETAILED DESCRIPTION

Figure 1:
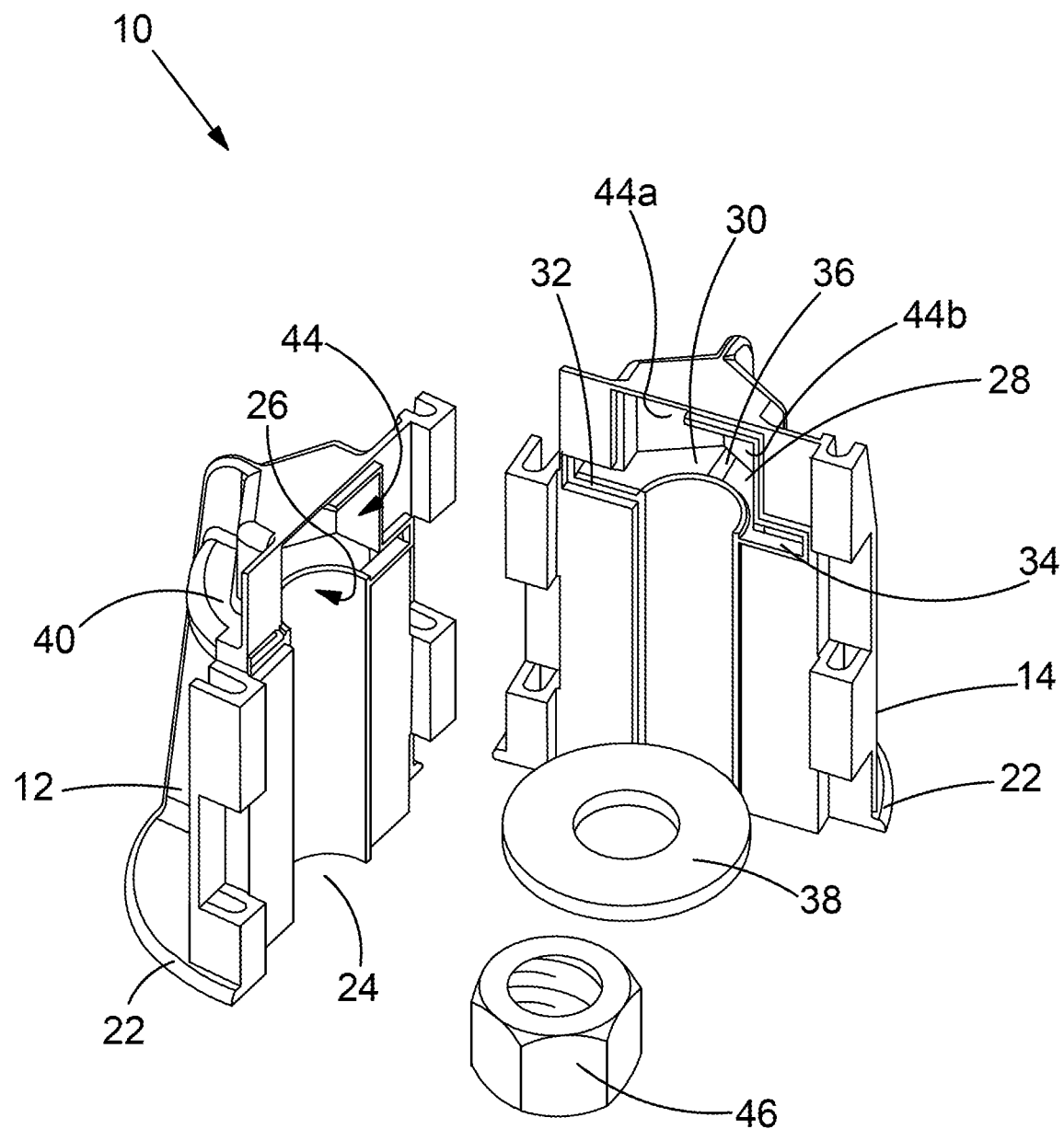
FIG. 1 illustrates an exploded view of an anchor 10 according to a first embodiment.
Figure 2:
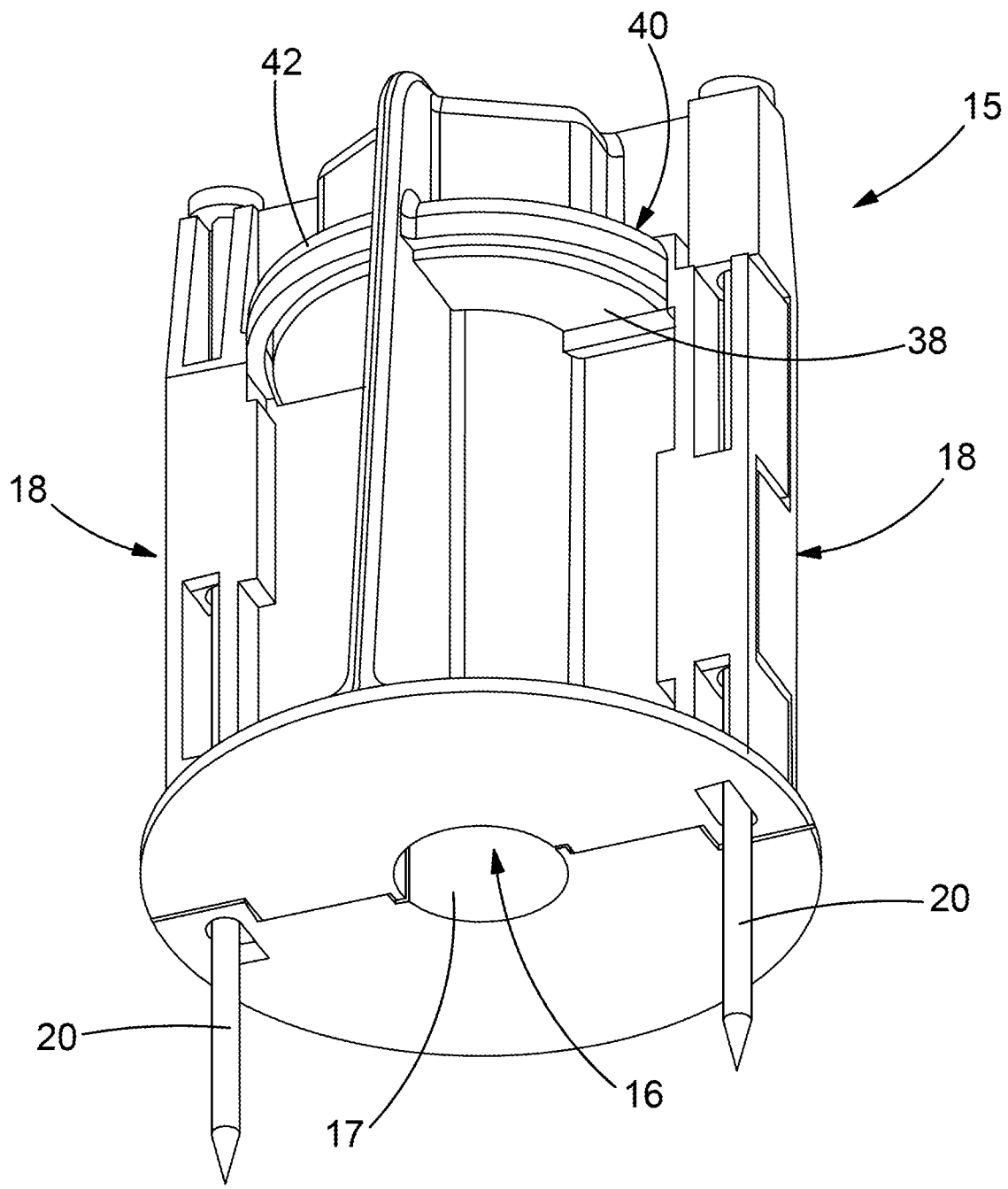
FIG. 2 illustrates an underside view of an anchor 10 in use (although the wooden form board is not shown to enable underside features of the anchor 10 to be seen)
Figure 3:
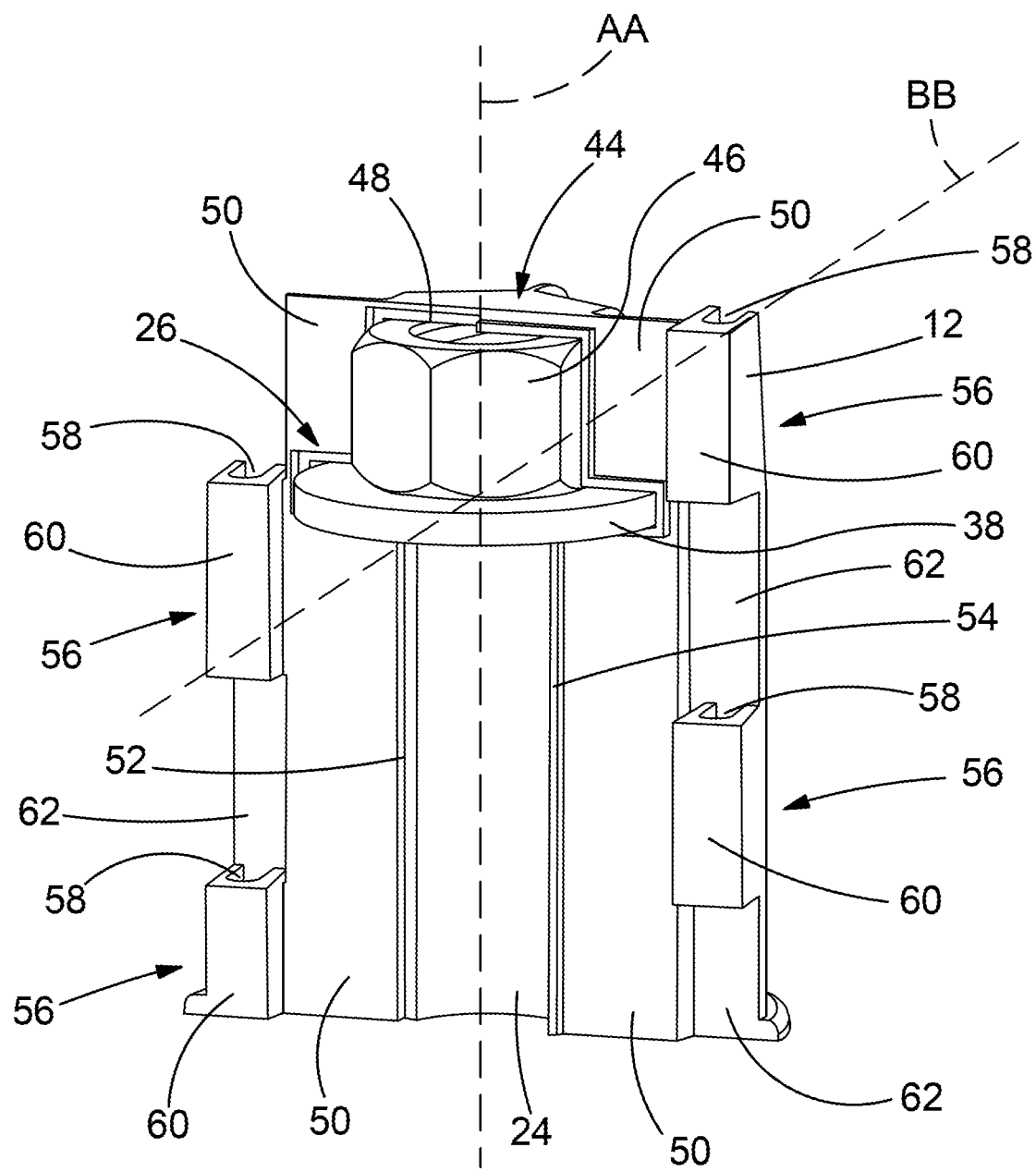
FIG. 3 illustrates the anchor 10 of FIG. 1 when partially assembled.

With reference to FIGS. 1 to 3 a cast-in-place anchor 10 is capable of being secured to a wooden form board by nails 20 which can be driven through the anchor 10 so they extend from the base thereof. Upon subsequently pouring wet concrete around the anchor 10 the concrete comes into direct contact with an exposed metallic washer 38. After concrete setting and the form board removal a threaded bolt can be inserted through an opening 17 in the base of the anchor 10 into threaded engagement with a metallic threaded nut 46 restrained within the anchor 10 in physical contact with the washer 38. A load applied to the rod is supported by reaction forces between the nut 46, the washer 38 and surrounding concrete. Since concrete sets in direct contact with the metallic washer 38 the washer 38 has no freedom of movement providing that when an object is attached to and suspended from the anchor 10 it experiences no downward movement upon being released.

FIG. 1 shows two identical clam shell body sections 12, 14 of an anchor 10 both formed of plastic and which cooperate to form a body 15. Such a plastic body defines a cavity 16 and a pair of nail guides 18 for receiving nails 20 to secure it to a form board.

With continued reference to FIG. 1 each body section 12, 14 has a flat base 22. A channel 24 extends away from the base towards a seat section 26. Each body section 12, 14 has a pair of openings 28, 30 and three support surfaces 32, 34, 36 at the seat section 26. A washer 38 formed of metal can be inserted into the seat section 26 such that it rests on the three support surfaces 32, 34, 36 as illustrated in FIG. 3. Additionally each seat section 26 has a roof 40 which forms an interference fit with a washer 38 inserted therein such that the combination of the roof 40, washer 38 and support surfaces 32, 34, 36 cooperate to restrict the ingress of wet concrete into contact with a threaded nut 46 via the openings 28, 30 in use. Each body section 12, 14 also has a rim 42 extending towards the base 22 which partially encompasses the washer 38 leaving an area of the underside of the washer 38 and also its rim exposed and thereby able to come into direct contact with wet concrete. Before concrete pouring the washer 38 therefore is cantilevered over a space which will later be filled with concrete. After pouring, an underside of washer 38 becomes a bearing surface through which load may be transferred from a threaded rod in threaded member 46 to washer 38 and into the concrete which now fills the pace over which washer 38 is cantilevered.

Now referring to FIGS. 1 and 3 each body section 12, 14 additionally has a chamber section 44 for receiving the aforementioned threaded nut 46, wherein the nut 46 is formed of metal. Facets 44a, 44b of the chamber section 44 are configured for cooperating with facets of the threaded nut 46 to restrict rotation of the nut 46. Looking at FIG. 3 in particular, the threaded nut 46 is arranged in the chamber section 44 such that when a downwards force is applied to it in use via a bolt threadably engaged with the nut 46, this force is transferred to the washer 38 and thus the surrounding concrete. Furthermore, an upper surface 48 of the chamber section 44 is arranged such that both the upper surface 48 and the washer 38 cooperate to restrict movement of the threaded nut 46 along the axis denoted AA.

Taking the arrangement illustrated in FIG. 3 and engaging it with the other body section 14, it will be understood from the foregoing that the washer 38 and threaded nut 46 are held in snugly in physical contact with each other between the body sections 12, 14. Planar surfaces 50 of the body sections 12, 14 will also contact each other and the cavity 16 formed within the resulting body 15 will be sealed, except for the opening 17 in the base.

In more detail and with continued reference to FIG. 3 opposite edges of the channel 24, seat section 26 and chamber section 44 are formed differently. A female edge 52 extends along one side of the channel 24, around one side of the seat section 26 and partially around the chamber section 44 from one side. A male edge 54 extends along the opposite side of the channel 24, around the other side of the seat section 26 and partially around the channel section 44 from the other side. When the body section 12 in FIG. 3 is engaged with an identical body section 14 in use, the female and male edges 52, 54 on the respective body sections 12, 14 will interlock to restrict the ingress of wet concrete into contact with the threaded nut 46 in use. How respective body sections 12, 14 are secured together will now be discussed with continued reference to the body section 12 illustrated in FIG. 3.

A set of receiving members 56 are provided on each side of the body section 12. The receiving members 56 each define an opening 58 which extends along an axis parallel to the aforementioned axis denoted AA. Moreover the openings 58 through the receiving members 56 on the right side in FIG. 3 are in alignment with each other for receiving a nail 20, whereas the openings 58 through the receiving members 56 on the left side in FIG. 3 are also in alignment with each other for receiving a nail 20.

The receiving members 56 have a dimension along a direction parallel to the axis denoted BB, the axis BB being perpendicular to both the axis denoted AA and the aforementioned planar surfaces 50. Primary engagement surfaces 60 of the receiving members 56 are located further than the secondary engagement surfaces 62 along a direction extending right-to-left in FIG. 3 parallel to the axis BB. This provides that the primary engagement surfaces 60 on the right side of the body section 12 in FIG. 3 are in alignment with each other along an upwardly extending direction, whereas the secondary engagement surfaces 62 also on the right side are in alignment with each other as well along an upwardly extending direction. The primary engagement surfaces 60 of the receiving members 56 on the left side of the body section 12 in FIG. 3 are also in alignment with each other along an upwardly extending direction.

Receiving members 56 on one side of the body section 12 in FIG. 3 align with gaps on the other side of the body section 12. This provides that when the body section 12 is engaged with an identical body section 14 in use, the receiving members 56 on the respective body sections 12, 14 interlock. The aligned openings 58 extending through a set of interlocked receiving members 56 form a nail guide 18. Inserting nails 20 through openings 58 in the interlocked receiving members 56, or in other words inserting nails through the nail guides 18 formed by cooperating body sections 12, 14 as illustrated in FIG. 4, will restrict the body sections 12, 14 from separating.

Figure 4:
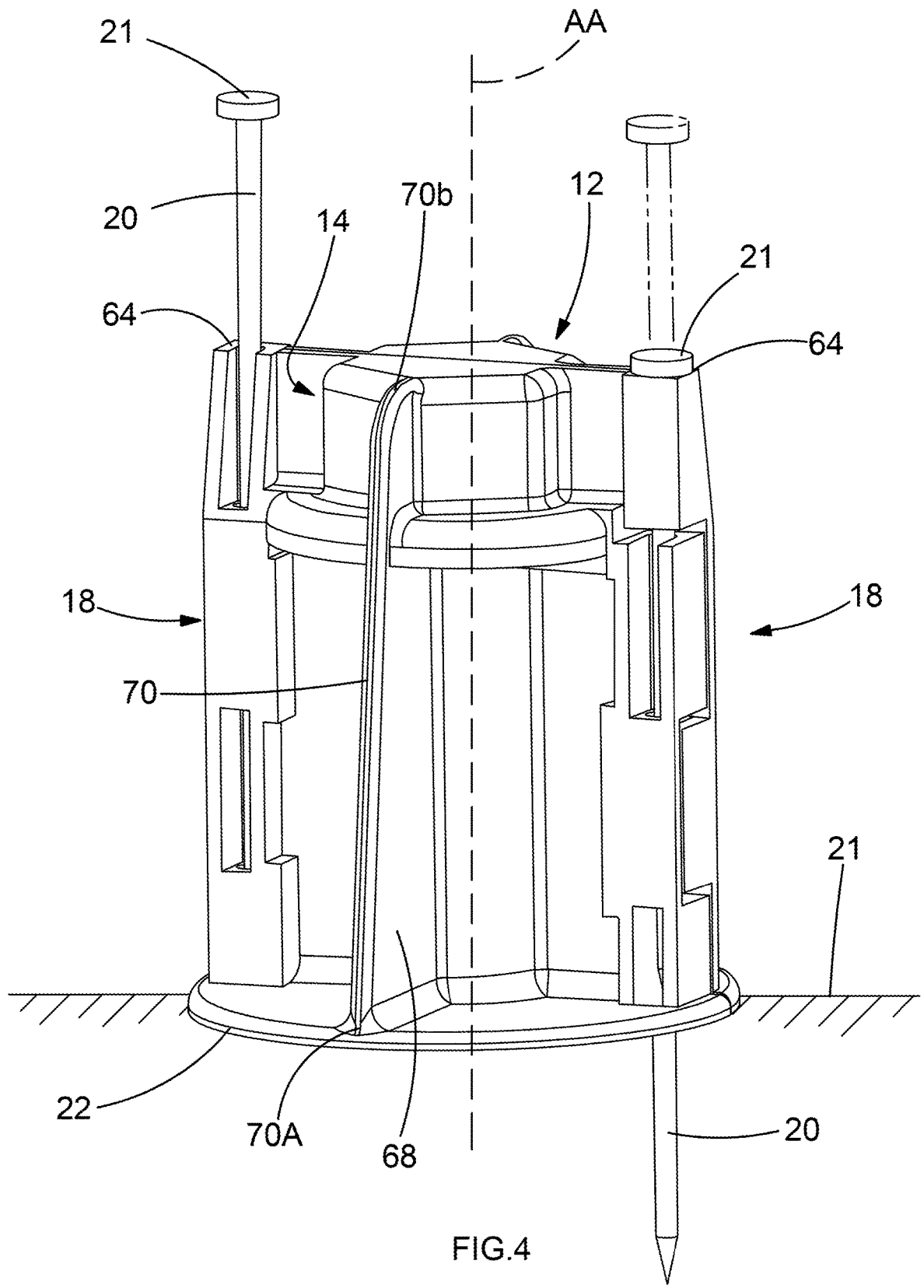
FIG. 4 illustrates the anchor 10 of FIG. 1 when assembled and while being secured to a wooden form board.
Figure 5:
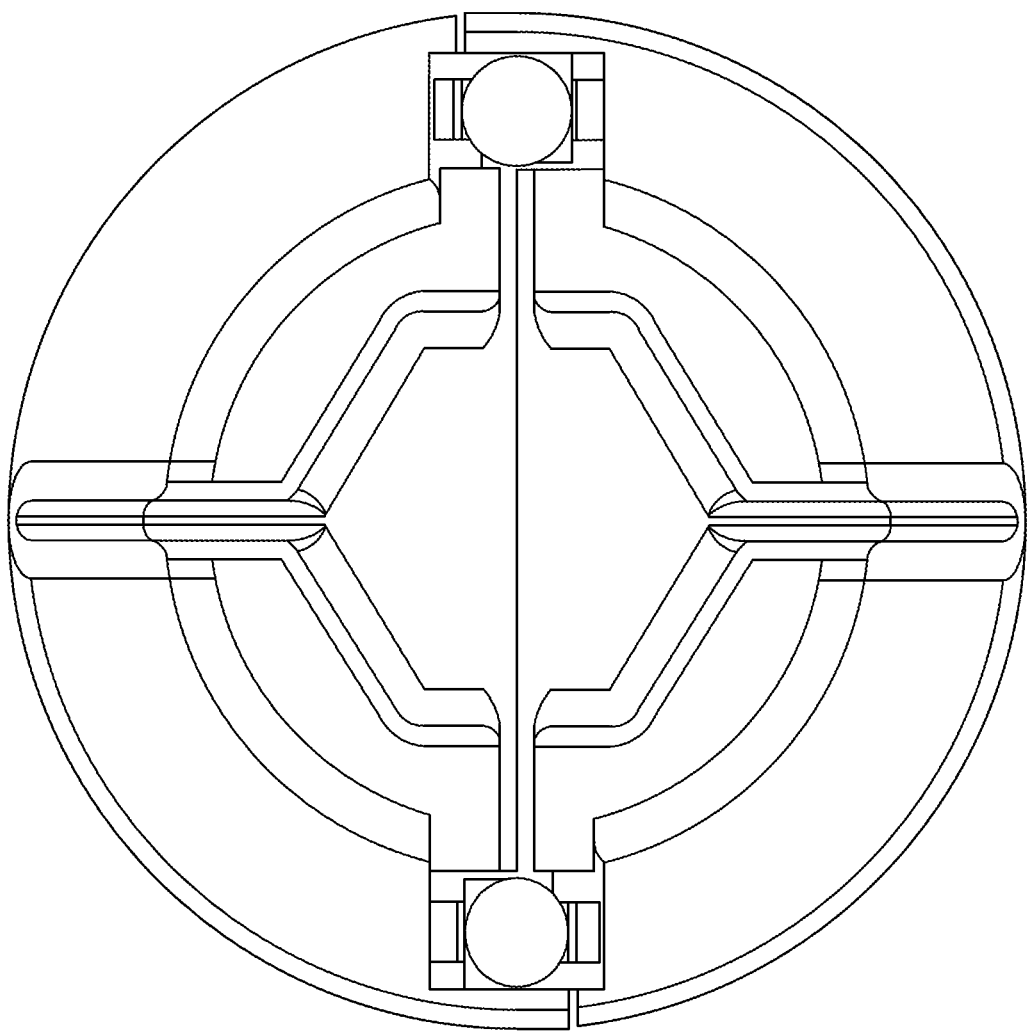
FIG. 5 illustrates a top-side view of the anchor 10 in FIG. 2.

With continued reference to FIG. 4, upon driving a nail 20 through a nail guide 18 the nail head 21 will engage a stopping surface 64 defined by an upper edge of the nail guide 18. Downwards movement of the nail 20 will cause it to protrude from bottom of the nail guide 18. Nails 20 can thus be used to restrict body sections 12, 14 from separating while simultaneously securing the anchor 10 to a wooden form board 21.

From the foregoing it is understood how the anchor 10 heretofore described is used, although nevertheless for completeness the steps involved are now discussed. A metallic washer 38 is inserted into the seat section 26 of a plastic body section 12. A metallic threaded nut 46 is inserted into the chamber section 44 of the plastic body section 12. The resulting arrangement is then interlocked with an identical plastic body section 14, whereby the metallic threaded nut 46 and metallic washer 38 are restrained within the interlocked body sections 12, 14 in contact with each other. The resulting arrangement is then placed on a wooden form board 21, whereby the base of the anchor 10 having an opening 17 in it aligns with the upper surface of the form board 21. Nails 20 are then driven downwards through nail guides 18 such that the nails 20 protrude from the bottom of the nail guides 18 into the wooden form board 21. After being secured to a form board 21 in this manner the base of an anchor 10 will be flush with the form board so that the volume within the anchor 10 between the opening 17 in its base and the metallic threaded bolt 46 is sealed.

Wet concrete is then poured over the anchor 10, wherein the heretofore described interlocked female and male edges 52, 24 restrict the ingress of wet concrete into contact with the threaded nut 44 within the anchor 10. Furthermore the interference fit between the washer 38 and also the roof 40 and support surfaces 32, 34, 36 of the respective seat sections 26 of the anchor 10 additionally restricts the ingress of wet concrete into contact with the threaded nut 44 housed within the anchor 10.

After the concrete has set the form board 21 is removed and a threaded bolt is inserted via the opening 17 in the base of the anchor 10 through the cavity 16 into contact with the threaded nut 44. The bolt is threadably connected to the nut 44 thereby enabling a load to be suspended from the bolt. In use, downwards forces exerted via the bolt on the threaded nut 44 are transferred to the washer 38 by virtue of their physical contact. Such forces are subsequently transferred to the surrounding concrete. Reaction forces between the threaded nut 46, the washer 38 and surrounding concrete thus enable a load applied to the threaded bolt to be supported. Furthermore since the threaded nut 44 is restrained in physical contact with the washer 38 within the anchor 10, and the washer 38 is in physical contact with dried concrete, no setting movement of components forming the anchor 10 occurs upon securing a load to the anchor 10.

Looking again at FIG. 4, each of the body sections 12, 14 of the anchor 14 are provided with a fin 68 which extends from the base 22 thereof to the top of the body section 12, 14. A distal edge 70 of each such fin 68 defines a surface that is sloped in a direction towards the top of the body section 12, 14. In other words the section 70a of the distal edge 70 closest to the base 22 of a respective body section 12, 14 is further from the axis AA extending along the cavity 16 of the anchor 10 than the section 70b of the distal edge closest to the top of the respective body section 12, 14.

The fins 68 assist in guiding objects over the anchor 10 in use upon coming into accidental contact with the anchor 10, which might occur upon securing the anchor 10 to a form board and prior to concrete pouring. Such an object might for instance be a rebar feature that is being positioned prior to concrete pouring. The sloped distal edge 70 of the fins 68 assist in guiding such a rebar feature over the anchor 10.

In the heretofore described embodiment the body sections 12, 14 are formed of plastic and both the washer 38 and threaded nut 46 are formed of metal. The anchor 10 thus requires less volume of metal than a similarly sized prior art anchor having an internally threaded metal bolt from which loads are to be suspended, for example the Wood-Knocker® II+ product. As a result manufacturing costs are reduced.

In some embodiments depending on the circumstances of intended use, respective components of the anchor 10 can be formed of different material to be selected by persons skilled in the art so as to achieve a particular purpose. For instance in situations where an anchor is to be set within a material other than concrete for suspending light loads therefrom all components of the anchor might be formed entirely of plastic. Furthermore, in other embodiments it is not inconceivable that all components of the anchor might be formed entirely of metal if so desired.

Figure 6:
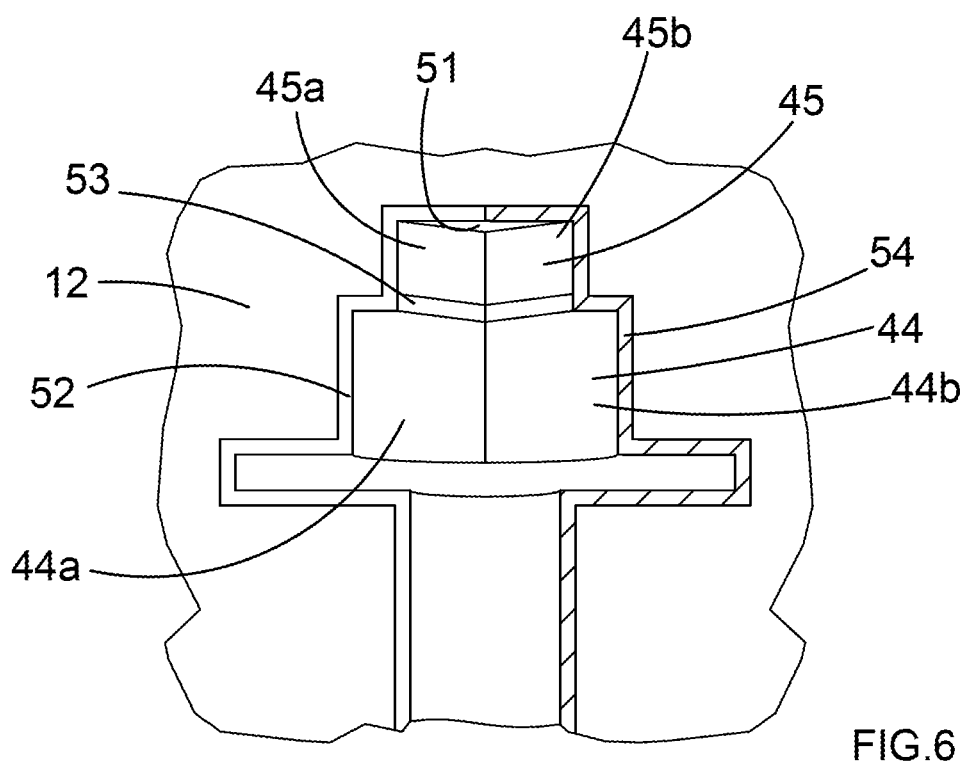
FIG. 6 illustrates part of a body section 12 of an anchor 10 according to another embodiment.
Figure 7:
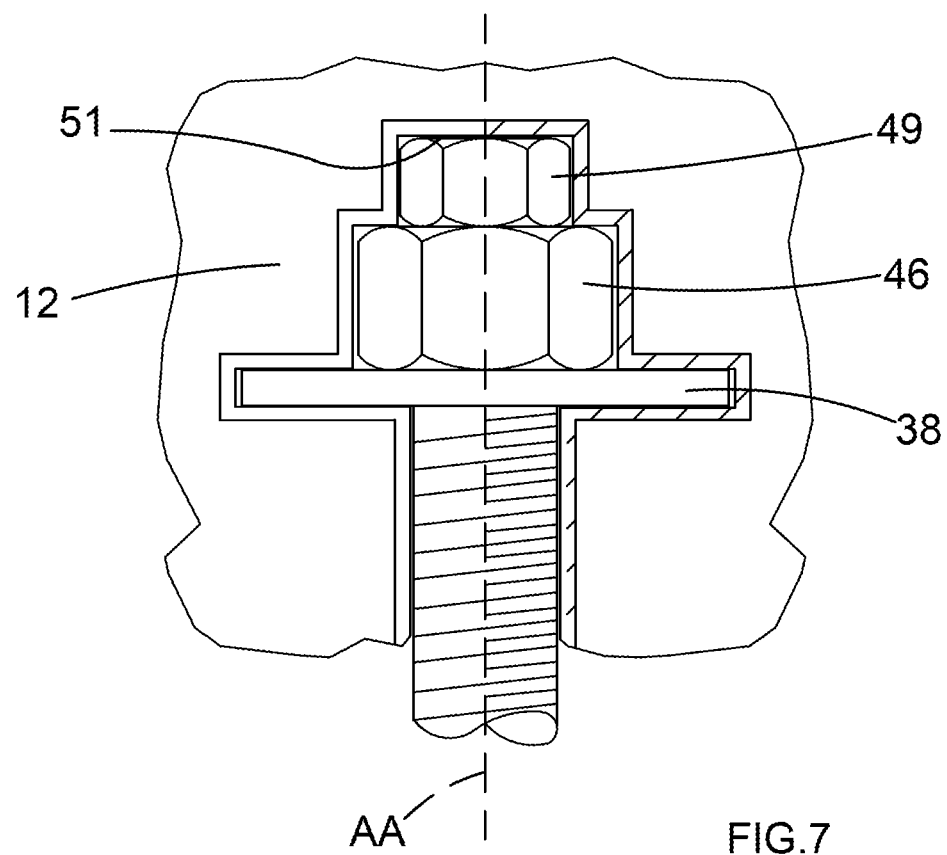
FIG. 7 illustrates the body section 12 of FIG. 6 after receiving a washer 38 and two threaded nuts 46, 49.

With reference to FIGS. 6 and 7 in some embodiments the anchor 10 may house two threaded nuts, namely a first threaded nut 46 as heretofore described and a second threaded nut 49. The second threaded nut 49 has a smaller thread diameter than the first threaded nut 46 and is restrained in contact with an upper surface of the first threaded nut 46. Body sections 12, 14 of an anchor 10 configured to house two nuts like this each have a multi-part chamber section. FIG. 6 in particular shows a first chamber section 44 similarly as heretofore described and a second chamber section 45 located above it. Like the first chamber section 44, the second chamber section 45 of respective body sections 12, 14 also has facets 45a, 45b that cooperate with facets of the second threaded nut 49 for restricting it from rotating.

Furthermore a step 53 between the first and second chamber sections 44, 45 defines a surface against which the upper surface of the first threaded nut 46 can bear. In particular the upper side of the washer 38 and the step 53 cooperate to restrict movement of the first threaded nut 46 along the axis AA extending along the cavity 16 defined by an anchor 10 in use. The upper side of the first threaded nut 46 and a roof 51 of the second chamber section 45 restrict movement of the second threaded nut 49 along the axis AA. Thus when an identical body section 14 cooperates with the body section 12 illustrated in FIG. 7 the washer 38, the first threaded nut 46 and also the second threaded nut 49 are restrained snugly within the anchor 10 formed.

FIG. 6 shows that the heretofore described female and male edges 52, 54 extend around the second chamber section 45 as well, whereby such edges on respective body sections 12, 14 interlock for restricting ingress of wet concrete into contact with the first and second threaded nuts 46, 49 in use.

After concrete setting and form board removal a threaded bolt sized to cooperate with the first threaded nut 46 can be extended through the opening 17 in the base of the anchor 10 into engagement therewith. Alternatively however a threaded bolt sized to cooperate with the second threaded nut 49 can be extended through the opening 17 in the base of the anchor 10, along the cavity 16 through each of the washer 38 and first threaded nut 46, into engagement with the second threaded nut 49 for threaded attachment therewith.

In other embodiments anchors 10 may be similarly configured to house three or more threaded nuts, provided they are stacked in order of decreasing thread diameter in a direction extending away from the washer 38.

In some embodiments the heretofore described female and male edges 52, 54 on respective body sections 12, 14 could be configured as male and female clip members so that respective body sections 52, 54 clip together upon being engaged with each other. In such embodiments features forming nail guides 18 as heretofore described need not necessarily be provided and instead the body sections 12, 14 may each merely have an opening in the base thereof for receiving a nail 20 to secure the anchor 10 to a form board.

Figure 8:
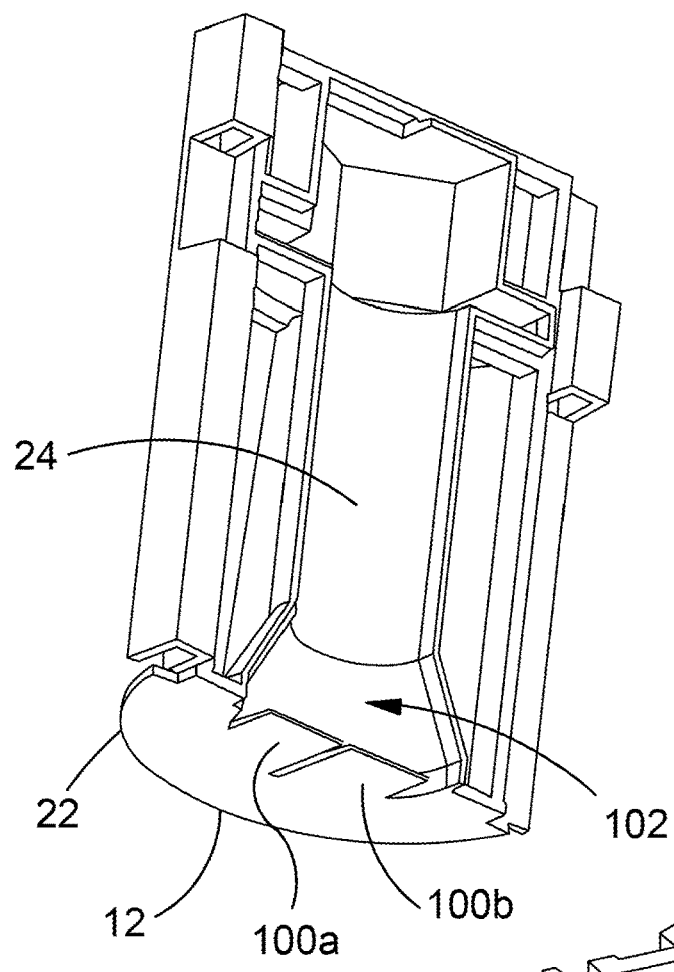
FIGS. 8 to 10 illustrate parts an anchor 10 according to another embodiment.
Figure 9:
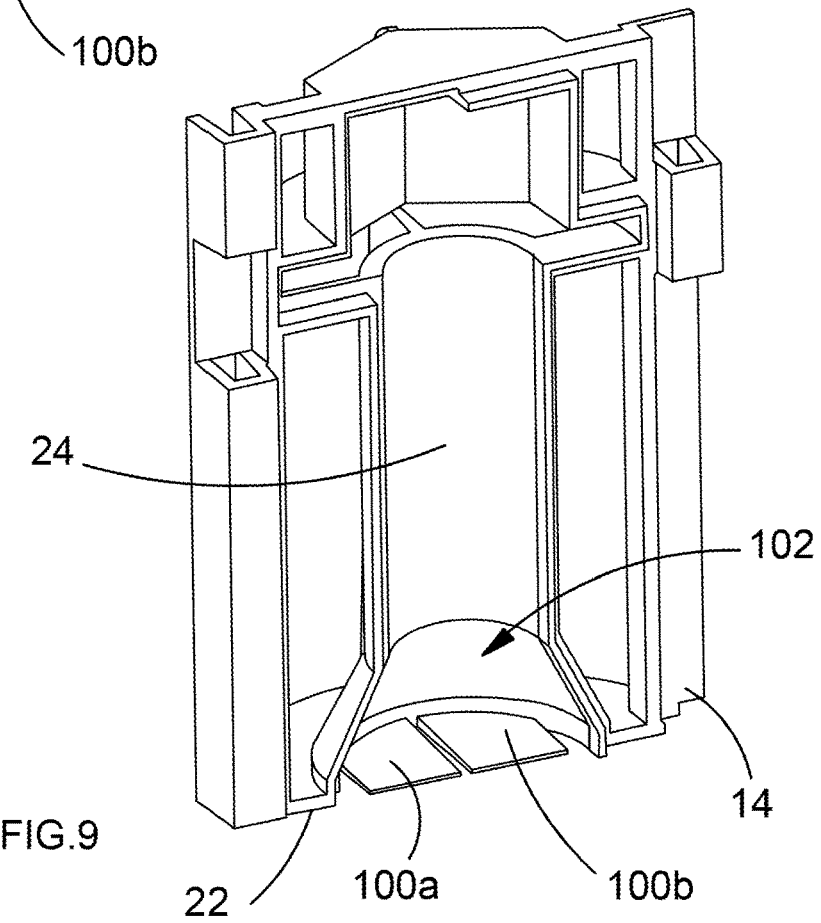
Figure 10:
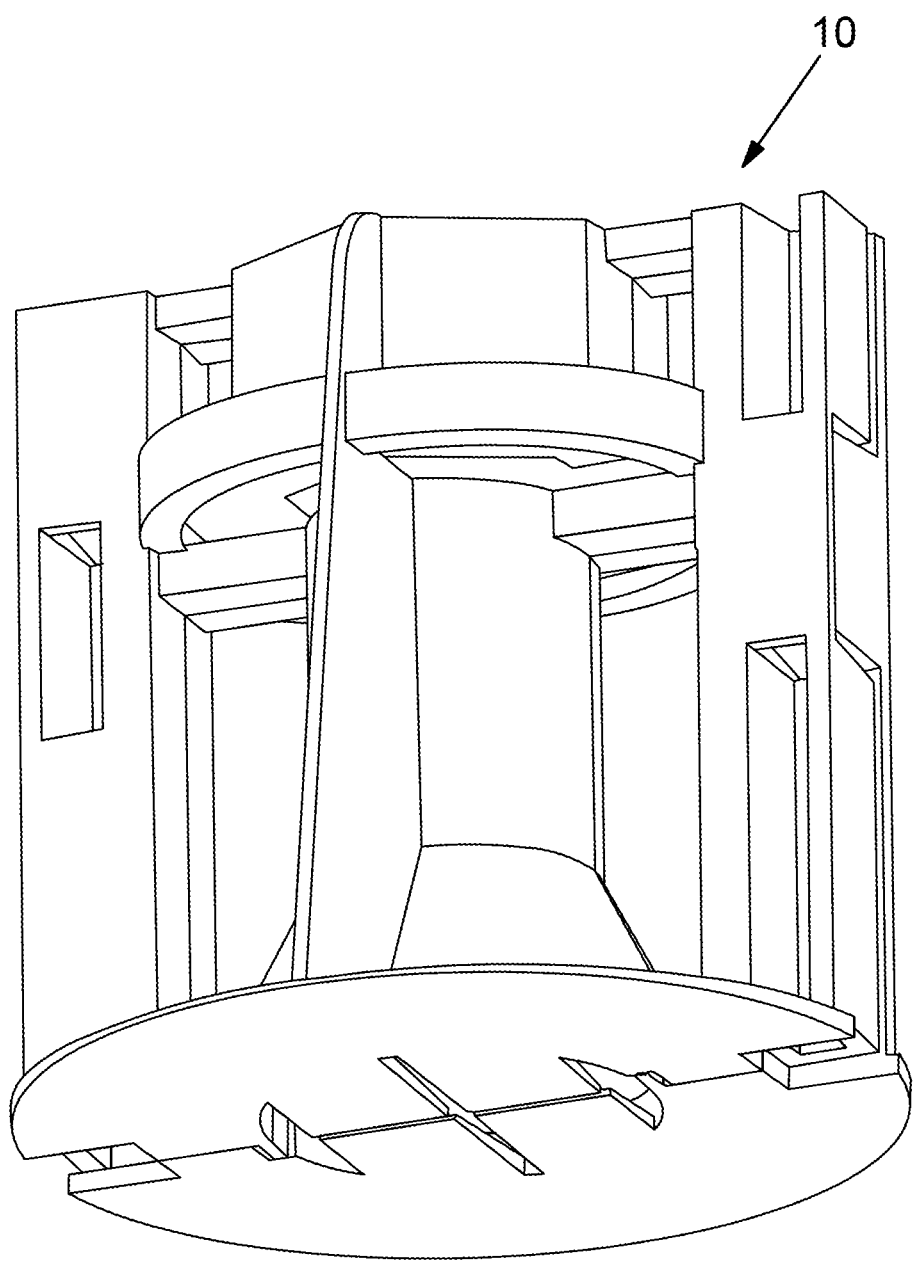

In some embodiments the body sections 12, 14 can be provided with a set of projections 100a, 110b at the base 22. These projections 100a, 100b extend across the face of the channel 24 as illustrated In FIGS. 8 to 10. The channels 24 have a conical section 102 which has a diameter that increases in a direction towards the base 22. In use, when the respective body sections 12, 14 are coupled to one another, the projections 100a, 100b cooperate to at least partially close off the opening 17 in the base of the anchor 10. The anchor 10 can be configured such that upon forcing threaded bolt against the projections 100a, 110b they are caused to bend inwards, thereby enabling the rod to be inserted along the cavity 16 within the anchor 10 into engagement with a threaded nut housed therewithin. It will be appreciated that the FIG. 10 arrangement is merely an example and the shape of the projections could be changed, for example in some embodiments the projections might not have a gap between them different to the arrangement in FIG. 10. Also in some arrangements the projections could be configured to break off when a threaded bolt is urged against them as described.

It will be appreciated that whilst various aspects and embodiments have heretofore been described, the scope of the present invention is not limited thereto and instead extends to encompass all arrangements, and modifications and alterations thereto, which fall within the spirit and scope of the appended claims. For example although the channels 24 of the respective body sections 12, 14 have been illustrated as being substantially curved, this is not necessarily essential provided that a bolt can be inserted along the cavity 16 formed when respective body sections 12, 14 are connected.

Furthermore looking back at FIG. 2, in some embodiments the rim 42 of respective body sections 12, 14 can be sized to cooperate with the rim of the washer 38 so that a substantially flush fit is provided between the rim 42 and the washer 38.

In some embodiments the anchor 10 may be configured to include a support member other than a washer 38, for example a square shaped member or otherwise defining an opening. In such embodiments the seat sections 26 need to be adapted to receive such a support member.

The invention claimed is:

1. A cast-in-place anchor comprising:
    a body defining a cavity and having a base for positioning the body on a wooden form board, the body being configured to be secured to the wooden form board by at least one fixing member;
    an opening in the base of the body in communication with the cavity;
    a threaded member provided in the cavity;
    a support member also provided in the cavity for supporting the threaded member;
    wherein the anchor is configured such that after concrete pouring, concrete setting and form board removal in use, a threaded rod can be inserted into the opening in the base of the body, past the support member and into threaded engagement with the threaded member for suspending a load from the anchor;
    wherein the body comprises a plurality of separable clam shell body sections which cooperate to define the cavity and at least one nail guide for receiving a nail to secure the anchor to the wooden form board.

2. The cast-in-place anchor of claim 1, wherein each said clam shell body section includes engagement surfaces aligned along an upwardly extending direction.

3. The cast-in-place anchor of claim 1, wherein each said body section is identical.

4. The cast-in-place anchor of claim 1, wherein each said body section comprises at least one set of guide members which are configured to interlock with the guide members of another said body section to form said nail guide.

5. The cast-in-place anchor of claim 4, wherein each said nail guide is configured such that a nail received thereby in use restricts the respective body sections forming the nail guide from separating while securing the anchor to the wooden form board.

* * * * *